United States Patent [19]
Rydbeck

[11] Patent Number: 5,384,844
[45] Date of Patent: Jan. 24, 1995

[54] PIVOTABLE HOUSING FOR HAND-HELD TRANSCEIVER

[75] Inventor: Nils R. Rydbeck, Cary, N.C.

[73] Assignee: Ericsson GE Mobile Communications, Inc., Lynchburg, Va.

[21] Appl. No.: 99,536

[22] Filed: Jul. 30, 1993

[51] Int. Cl.6 .............................................. H04M 1/00
[52] U.S. Cl. ..................................... 379/433; 379/434
[58] Field of Search ............... 379/433, 434, 428, 58, 379/61; 455/89, 90; D14/137, 138

[56] References Cited

U.S. PATENT DOCUMENTS

| | | |
|---|---|---|
| D. 272,344 | 1/1984 | MacKenzie . |
| D. 295,411 | 4/1988 | Cho et al. . |
| D. 297,736 | 9/1988 | Krolopp et al. . |
| D. 309,301 | 7/1990 | Soren et al. . |
| 4,471,493 | 9/1984 | Schober . |
| 4,845,772 | 7/1989 | Metroka et al. . |
| 4,897,873 | 1/1990 | Beutler et al. . |
| 4,903,325 | 2/1990 | Yoshitaki et al. . |
| 4,912,602 | 3/1990 | Zurek et al. . |
| 4,926,474 | 5/1990 | Marks . |
| 5,014,346 | 5/1991 | Phillips et al. ...................... 379/433 |
| 5,029,236 | 7/1991 | Yasuda et al. . |
| 5,170,173 | 12/1992 | Krenz et al. . |
| 5,274,882 | 1/1994 | Persson ................................ 16/303 |

Primary Examiner—James L. Dwyer
Assistant Examiner—Jack Chiang
Attorney, Agent, or Firm—Nixon & Vanderhye

[57] ABSTRACT

A radiotelephone having a hinged flip cover that protects a keypad when closed and assists the operation of the microphone when open. The key pad and display are located on the same side of the radiotelephone and a microphone and speaker are on the other side. The flip cover is hinged to a bottom edge of the radiotelephone. The hinge pivots through an angle of greater than 180 degrees. Accordingly, the hinge folds over at least a portion of the keypad when closed and unfolds to the opposite side of the radiotelephone to form an angle of less than 180 degrees with that opposite side. A microphone and antenna may be located within the flip cover.

7 Claims, 7 Drawing Sheets

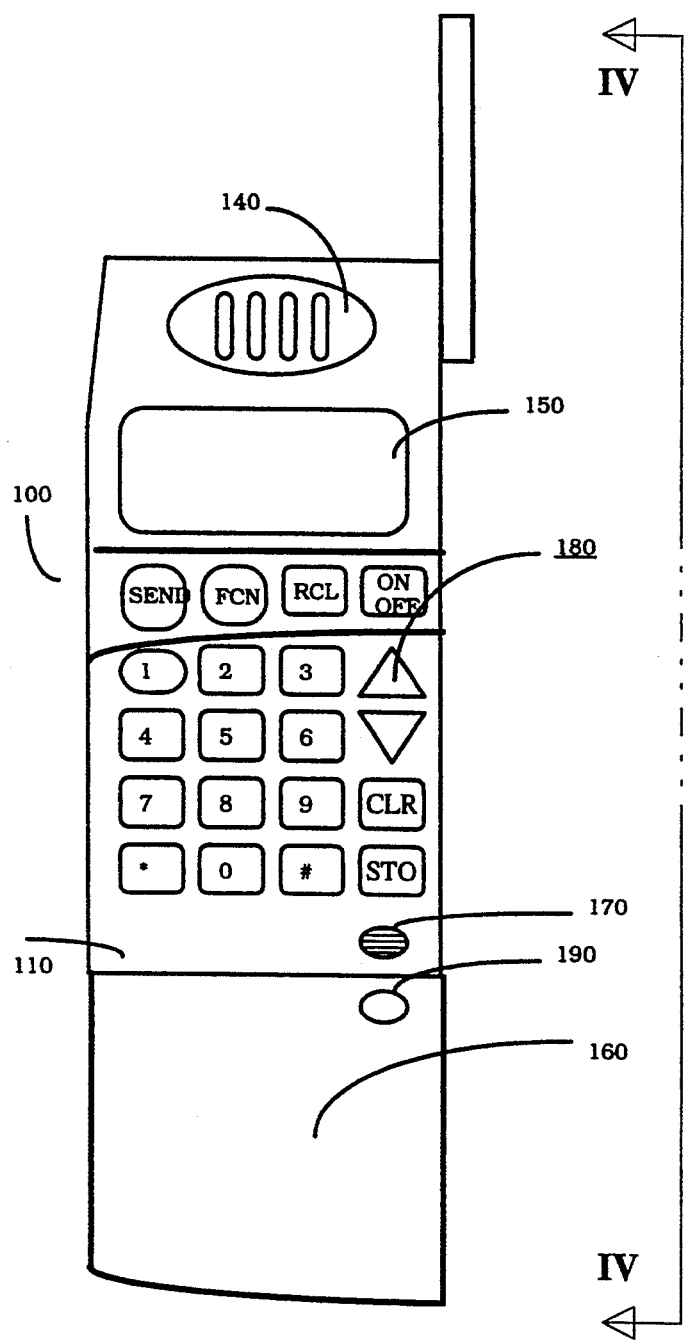
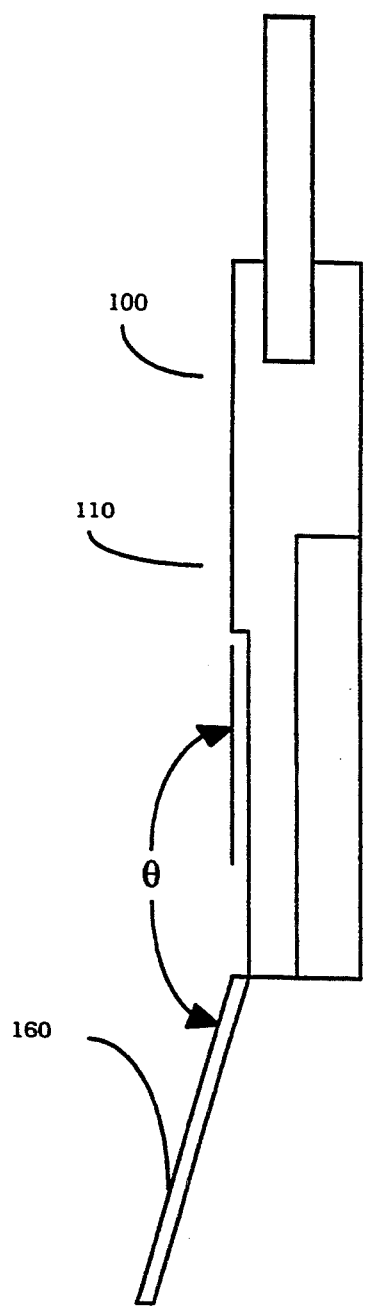
Figure 3
Prior Art
Figure 4
Prior Art

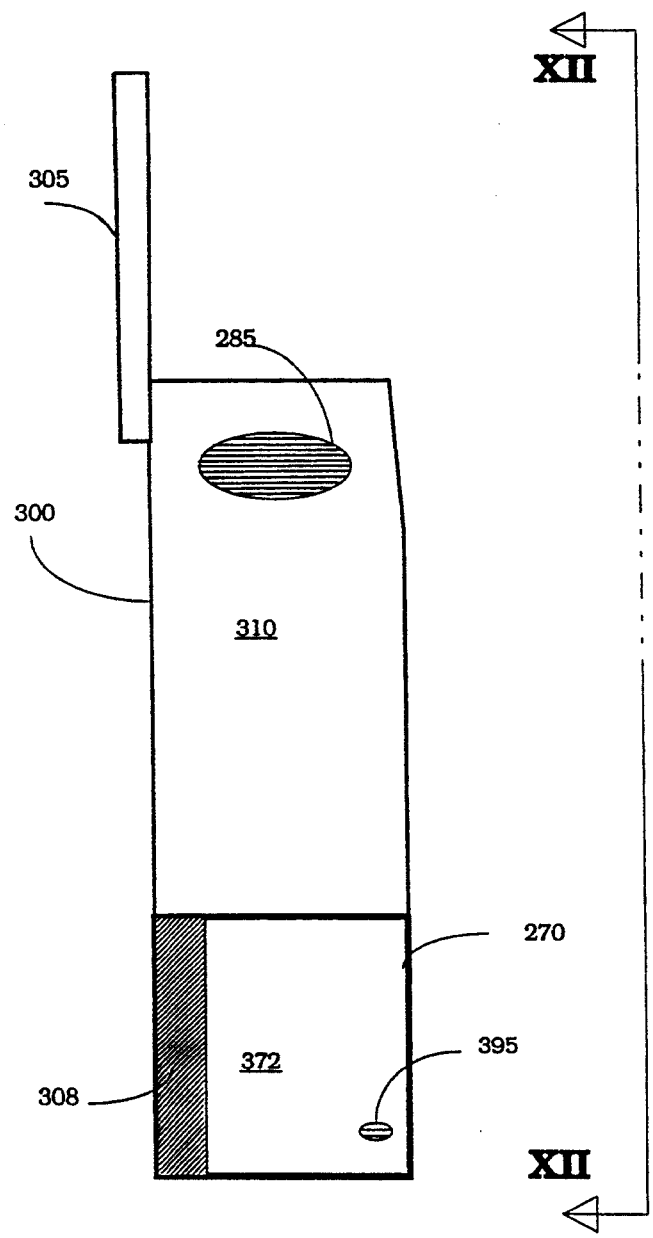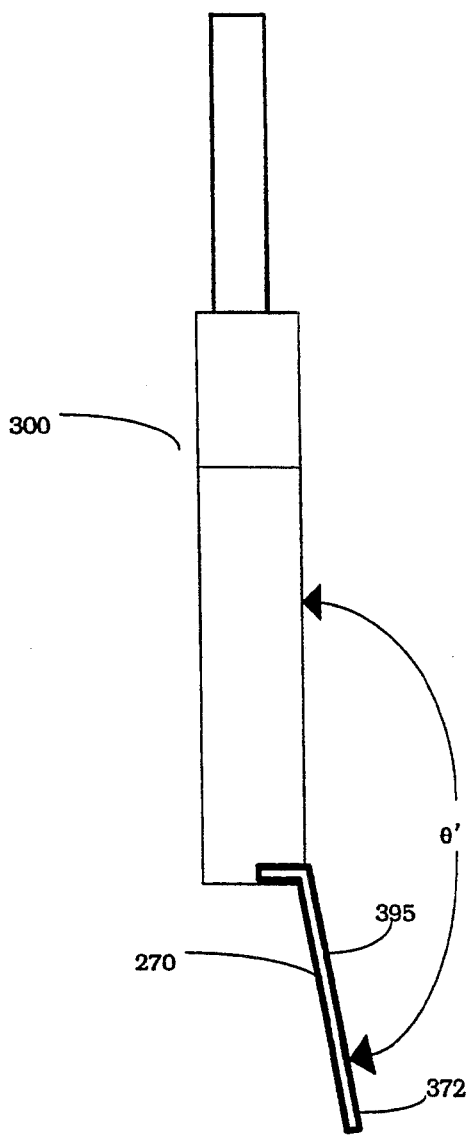
Figure 11
Figure 12

PIVOTABLE HOUSING FOR HAND-HELD TRANSCEIVER

FIELD OF THE INVENTION

The invention presented relates generally to radiotelephones and more specifically to cellular radiotelephones with a hinged cover extending over a portion thereof.

RELATED PATENTS

The present invention is related to co-pending U.S. patent application Ser. No. 07/845,184 (now U.S. Pat. No. 5,274,882) entitled "Hinge Mechanism" invented by Per-Håkan Persson, filed Mar. 3, 1992 and assigned to the parent company of the present assignee. This co-pending application is incorporated by reference in its entirety into the written description of the present invention.

BACKGROUND AND SUMMARY OF THE INVENTION

Portable radiotelephones having a flip cover are well-known devices offered by several manufacturers. The flip element is a hinged cover which extends over an integral keypad or a portion of the keypad. One example of a hinged cover extending over the whole of the keypad is presented in U.S. Pat. No. 4,845,772. The flip cover may contain a microphone as described in U.S. Pat. No. 4,897,873 or an integral antenna as presented in U.S. Pat. No. 5,170,173. When closed, the flip element provides protection to the keypad from unintentional activation or exposure to the elements. When opened, the flip element provides a convenient extension to the phone and, when fitted with a microphone, is well-positioned to receive audio input from the user's mouth. In addition to these tangible benefits, there is also an unqualified consumer appeal for such flip elements.

FIGS. 1 to 4 show a conventional radiotelephone 100 with front 110 and rear 120 faces, and a flip cover 160 shown in closed (FIGS. 1 and 2) and open (FIGS. 3 and 4) positions. A display 150, speaker 140, microphone 170, and keypad 180 are disposed on the front 110 of the radiotelephone. In this example, the microphone 170 is located not in the flip cover 160 but within the main body of the radiotelephone. With this arrangement, the flip cover opens as is shown in FIGS. 3 and 4. When open, the flip cover directs sound pressure into the microphone 170. When the flip cover 160 is closed, sound pressure passes through an aperture 190 in the cover positioned over the microphone 170. The angle $\theta$ between the open cover and the front face of the radiotelephone is specified to be 158 degrees by the CCITT Specification. Such an arrangement is well-known to those skilled in the art.

As the technology regarding radiotelephones matures, it is expected that these devices will enjoy further miniaturization. Indeed, in less than a decade radiotelephones have progressed from bulky vehicular mounted devices to compact hand held appliances which can easily fit into a shirt pocket. This trend towards miniaturization however presents several drawbacks.

Consider, for example, that the necessity for human interface imposes certain minimum requirements. For example, it is obvious that as a two-way communication device, a portable radiotelephone must include both a microphone and a speaker. In addition, a radiotelephone must have disposed somewhere on its outer surface a display for providing visual information and a keypad for accepting user inputs. Indeed, to provide even minimal functionality, the keypad must also have a certain number of keys (e.g., 0 through 9 inclusive, a "#" key and a "*" key). Human interface devices must, of course, also meet certain minimum physical requirements which, if exceeded, would make the radiotelephone inconvenient to operate. For example, the keys on the keypad must be of a size which is commensurate with the operator's fingers. The display must also be large enough such that even a user with moderate visual acuity can easily read the characters. Further, the speaker should be optimally located over the user's ear and the microphone positioned directly in front of the user's mouth.

As the overall dimensions of the radiotelephone shrink, so does the space available for the interface devices. Although the radiotelephone itself may become smaller, for example, the average distance between a user's ear and mouth is not expected to change much. Therefore, some consideration must be given to the challenge of packaging, on a rapidly shrinking radiotelephone, devices which must accommodate more static requirements.

The keypad and the display are generally disposed on the same surface of the radiotelephone. Similarly, the speaker and the microphone are also generally on the same side of the radiotelephone. If the speaker and microphone are positioned on the opposite side of the radiotelephone from the display and keypad, then a difficulty arises as to the positioning of the flip cover. The flip cover should cover the keypad when closed and, when opened, assist in the operation of the microphone.

Consider, for example, that for optimum sound quality the speaker should be positioned directly over the ear and the microphone positioned directly in front of the operator's mouth. Such an arrangement mandates a certain minimum separation between the speaker and microphone, e.g. 6 inches. Consider that with a miniaturized radiotelephone the microphone will likely be positioned over the operator's cheek, away from the mouth. This results in a loss of sound pressure level (SPL) at the input to the microphone. Tests have shown sound pressure levels reaching the microphone adjacent the cheek to be more than 10 dB lower compared to the ideal location when the microphone is in front of the mouth. Although the reduction of SPL can be compensated for by increasing the gain of the audio amplifiers to which the microphone signal is coupled, the signal to noise ratio cannot be corrected. Consequently, when a radiotelephone with a microphone adjacent the cheek is used in the presence of ambient noise the sound quality of the communication will suffer.

A flip cover element has the desirable quality that it extends the overall dimensions of the radiotelephone. In this regard, mounting the microphone in the flip cover may serve to position the microphone in a more advantageous position, such as closer to the user's mouth. Indeed, a well-designed flip element will also direct sound pressure from the user's mouth towards a microphone embedded within a surface of the main body of the radiotelephone. However, if the flip element is also intended to cover the keypad when closed it is not obvious how to also accommodate the requirements of a microphone mounted on the reverse side opposite to the keypad.

It is an object of the present invention to provide a miniaturized radiotelephone capable of incorporating many of the interface features commonly found on present radiotelephones. It is a further object of the present invention to provide a flip cover element capable of substantially covering the keypad of a miniaturized radiotelephone when closed and offering an advantageous position for the placement of a microphone when open.

BRIEF DESCRIPTION OF THE DRAWINGS

These and other features and advantages of the present invention will be readily apparent to one of ordinary skill in the art from the following written description, read in conjunction with the drawings, in which:

FIG. 3 is a schematic of the front view of conventional radiotelephone such as shown in FIG. 1 with an open flip cover element.

FIG. 4 is a schematic of the view along section IV—IV of FIG. 3.

FIG. 11 is a schematic of the rear view of an alternate embodiment of the present invention with the flip cover element open.

FIG. 12 is a schematic of the view along section XII—XII of FIG. 11.

DESCRIPTION OF THE PREFERRED EMBODIMENTS

Figures 1, 2:
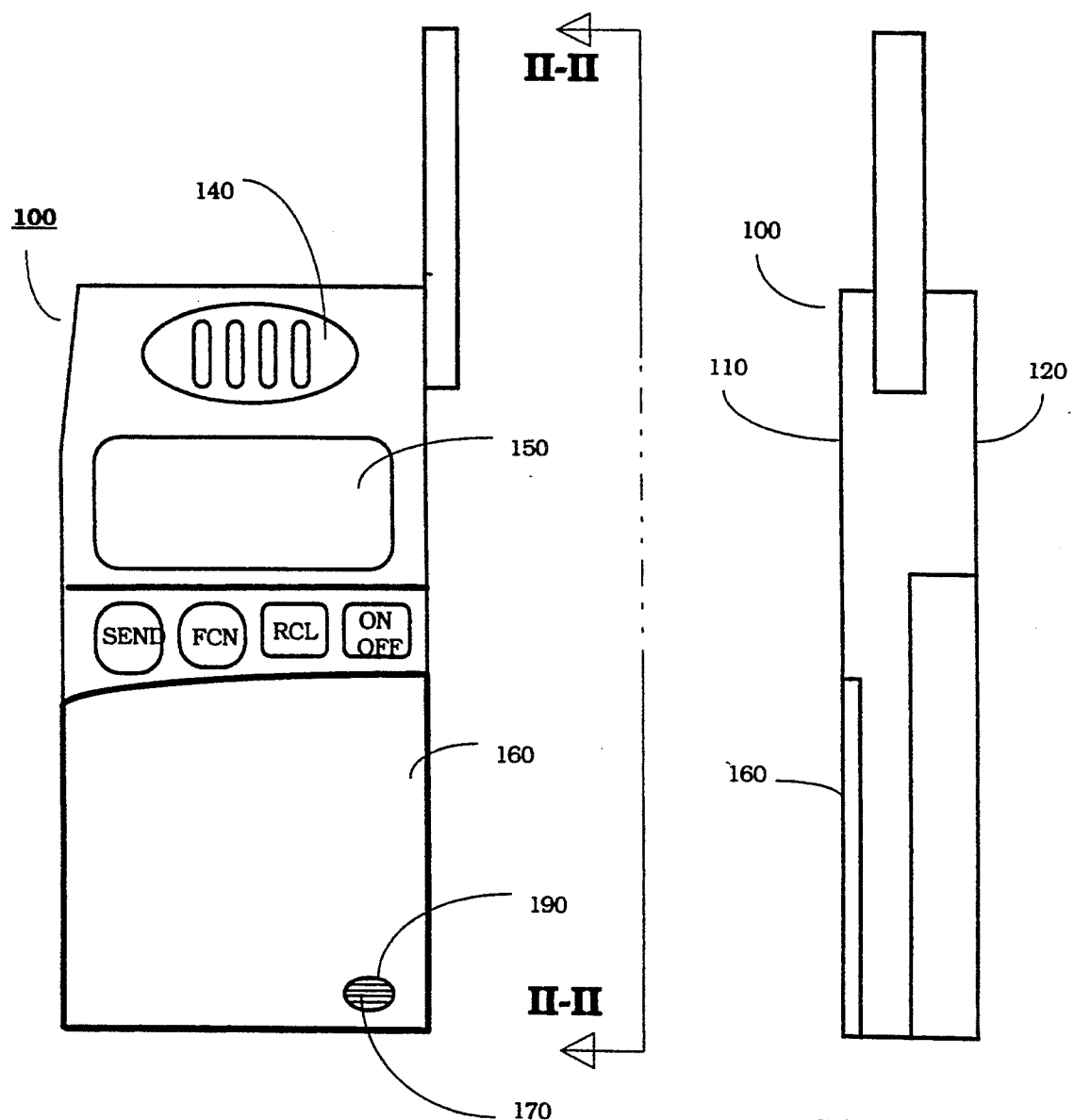
FIG. 1 is a schematic of the front view of conventional radiotelephone with a closed flip element.
FIG. 2 is a schematic of the view along section II—II of FIG. 1.
Figure 5:
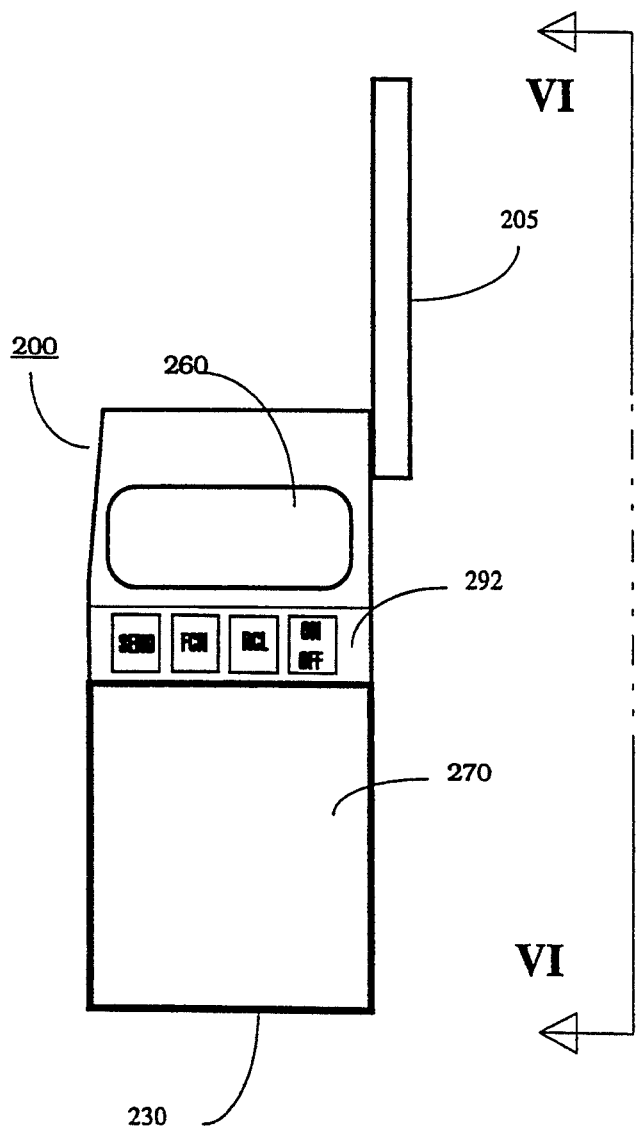
FIG. 5 is a schematic of the front view of an embodiment of the present invention with the flip cover element closed.
Figure 6:
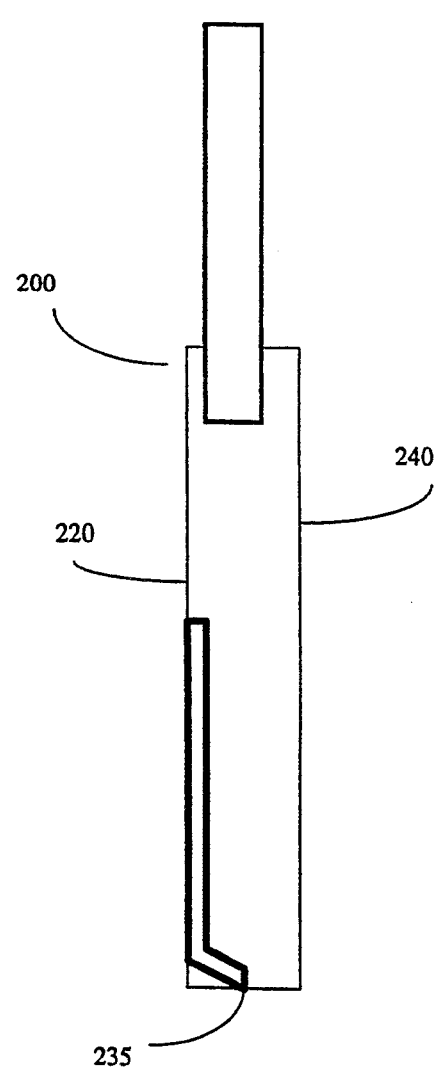
FIG. 6 is a schematic of the view along section VI—VI of FIG. 5.
Figures 7, 8:
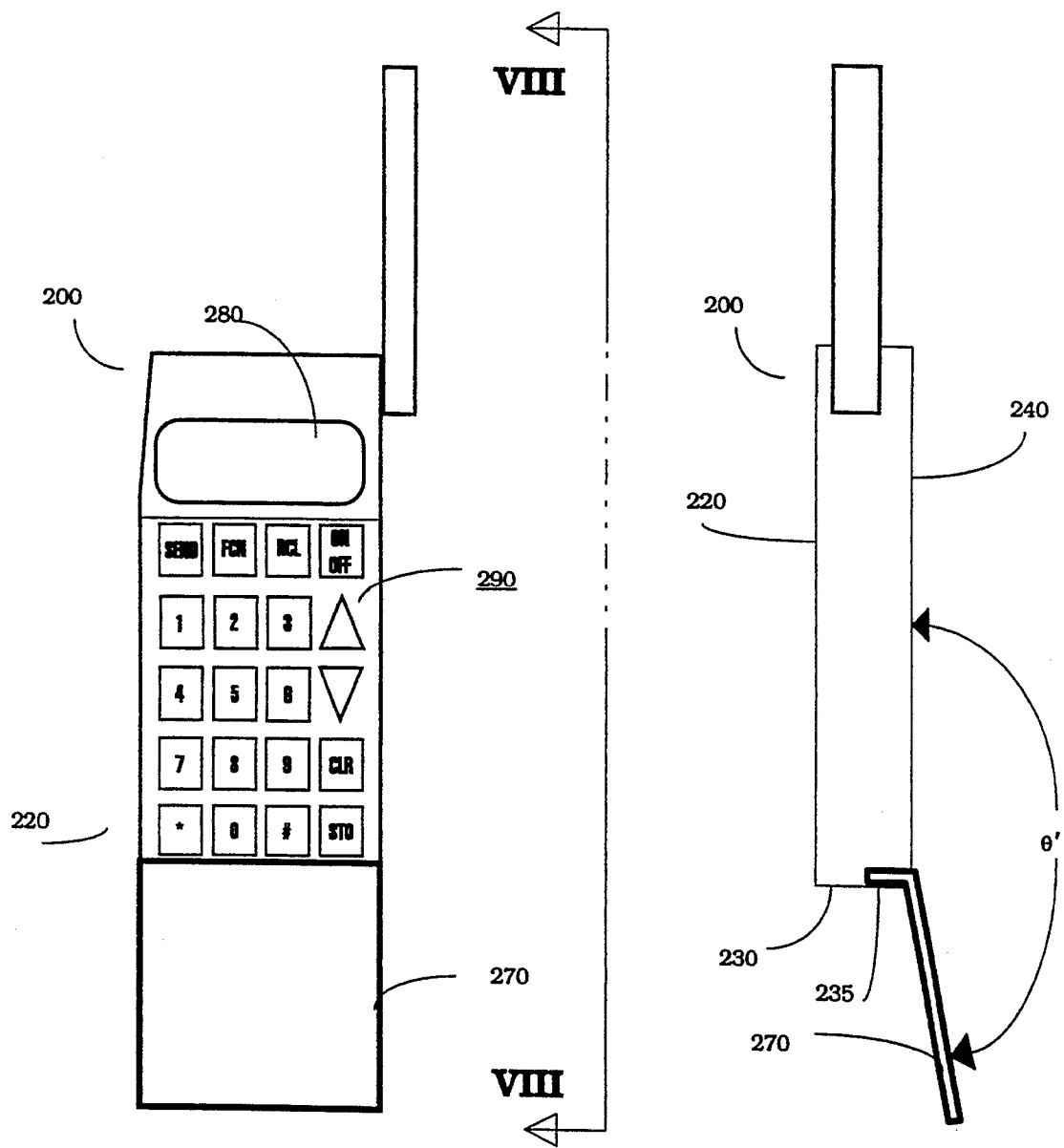
FIG. 7 is a schematic of the front view of the embodiment shown in FIG. 5 with the flip cover element open.
FIG. 8 is a schematic of the view along section VIII—VIII of FIG. 7.
Figure 9:
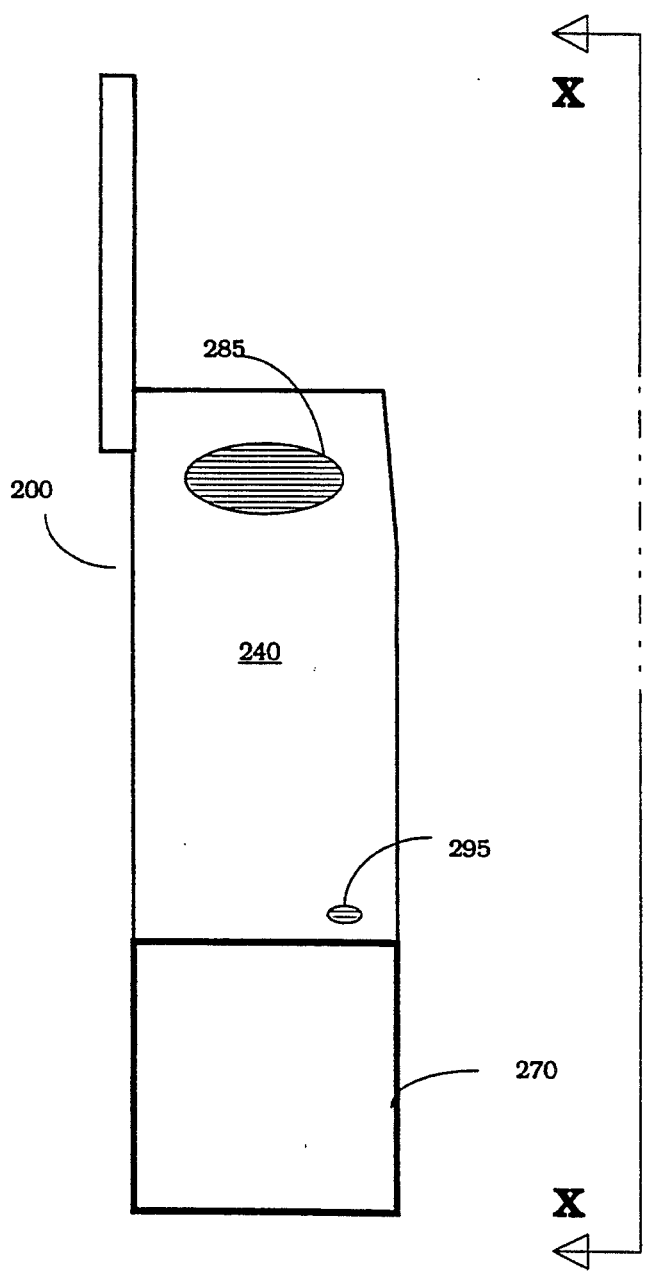
FIG. 9 is a schematic of the rear view of the embodiment shown in FIG. 5 with the flip cover element open.
Figure 10:
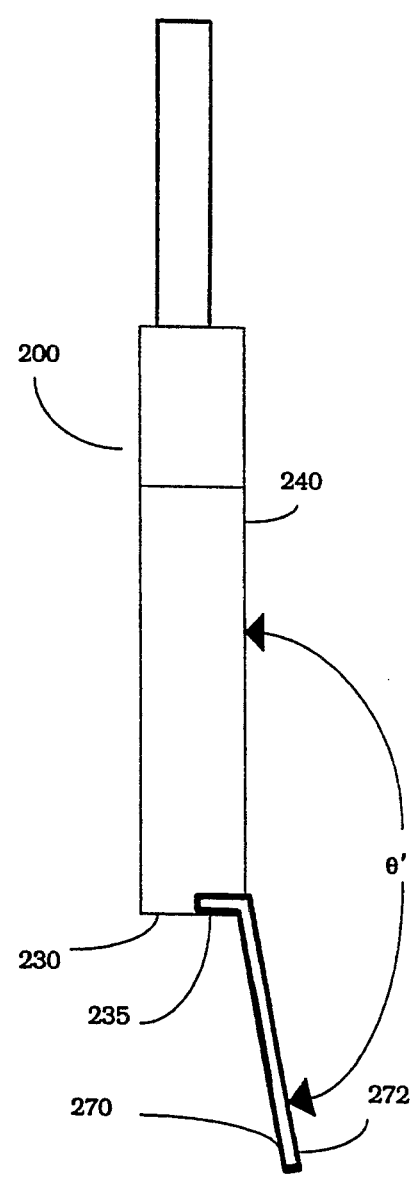
FIG. 10 is a schematic of the view along section X—X of FIG. 9.

FIGS. 5 to 10 illustrate a first radiotelephone 200 embodiment of the present invention. The display 260 and the keypad 290 are disposed on the front side 220 of the radiotelephone. A conventional antenna 205 extends upward from the radiotelephone. The speaker 285 and the microphone 295 are both disposed on the back side 240 of the radiotelephone. A flip cover element 270 is rotatably attached to the bottom edge 230 of the radiotelephone via a hinge 235. The flip cover is shown in a closed position in FIGS. 5 and 6, and in an open position in FIGS. 7 to 10. The flip cover pivots about its hinge between the open and closed positions.

When in the closed position, the flip element covers partially the keypad 290 thereby enabling the operator to access the keys necessary to answer an incoming call without opening the flip cover 270. This is normally done, for example, by pressing the "SEND" key in the first key row 292 in response to an alarm, e.g., ringing sound. The flip element is capable of rotating about its hinge through an angle of greater than 180 degrees. In the disclosed embodiment, the angle of rotation would be approximately 202 degrees. When the flip cover 270 is in the open position, the front face 272 of the flip cover 270 is positioned with regard to the plane of the speaker at the ideal angle $\theta'$ of 158 degrees.

A second embodiment of the radiotelephone 300 is illustrated in FIGS. 11 and 12. Reference is made to the above description of FIGS. 5 to 10 for a descriptions of features of the second embodiment common to the first embodiment and not needed to described the second embodiment. The microphone 395 is located on the outside surface 372 of the flip cover 270 in such a location as to be conveniently positioned over the user's mouth when the flip cover is extended to its open position. In addition, a conventional antenna 305 extends from the radiotelephone body 310 and second antenna 308 is embedded within the flip cover 270. The second antenna may serve as the primary antenna where there is no conventional antenna 305, or may serve as a diversity antenna.

Figure 13:
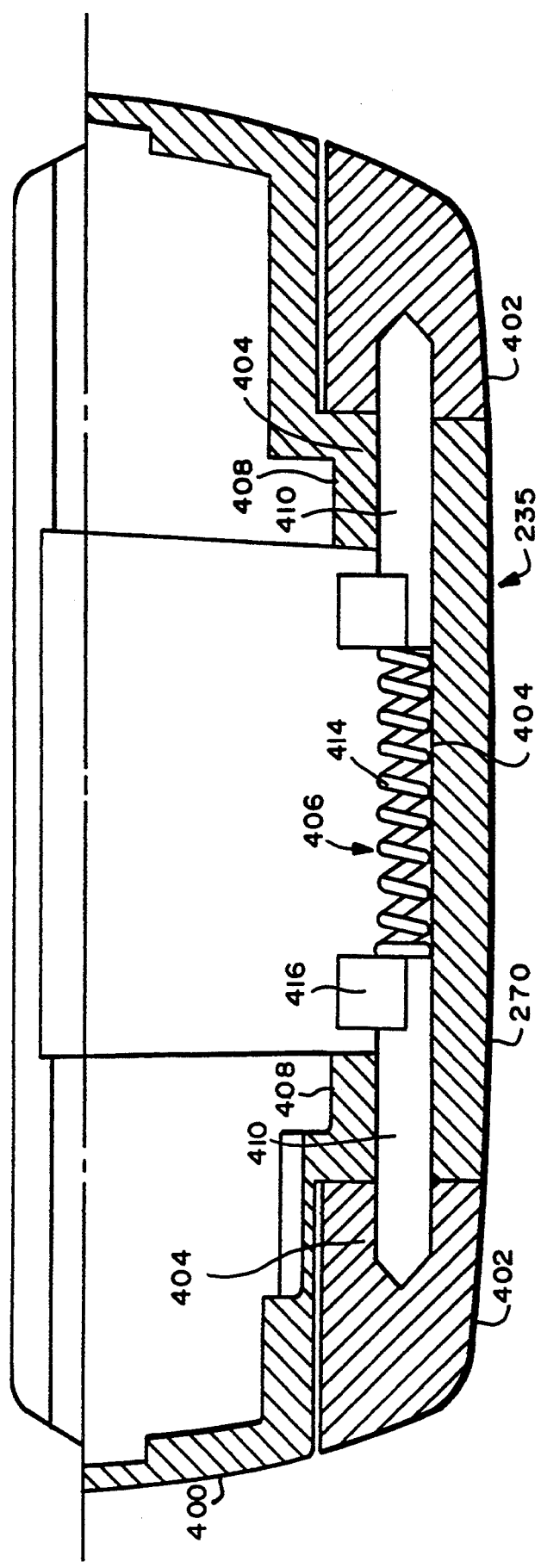
FIG. 13 is a perspective view along line XIII—XIII of FIG. 6 of a pair of axles and a compression member for a hinge between a flip cover and a radiotelephone housing.

FIG. 13 shows a hinge mechanism 235 for the hinge between the flip cover 270 and radiotelephone housing 400. The flip cover 270 has a protruding hinge section 402 having transverse recesses 404 for receiving the ends of a hinge pin 406. The hinge section of the flip cover straddles a housing hinge section 408 that protrudes from the bottom edge of the radiotelephone. The housing hinge section has a center opening in between two hinge pin recesses 410 that extend from the bottom of the housing. The hinge pin 406 includes a pair of end rods 412 that slide into the recesses of the housing and the flip cover to coaxially align the recesses, a spring 414 between the end rods so that the rods can be pinched together, and pinch tabs 416 for grasping the hinge pin. The hinge pin pivotably fixes the flip cover to the housing of the radiotelephone. The flip cover The hinge mechanism may also be similar to that described in the aforementioned co-pending U.S. patent application Ser. No. 07/845,184 suitably modified as necessary to accommodate the increased angle of rotation.

The invention has been described in what is currently considered to be the best and preferred embodiments. The invention is not limited to these embodiments, but covers various changes and modifications to the invention that are within the letter and spirit of the following claims.

I claim:

1. A portable radiotelephone comprising:
   a. a keypad positioned on a first side of said radiotelephone;
   b. a speaker positioned on a second side of said radiotelephone, said second side being opposite to said first side;
   c. a flip cover hinged to said radiotelephone, said flip cover having a closed position that at least partially covers said keypad and an open position angled at less than approximately 180 degrees to said second side of the radiotelephone.

2. A portable radiotelephone as in claim 1 further comprising a microphone disposed within said flip cover.

3. A portable radiotelephone according to claim 1 wherein said flip cover includes an antenna.

4. A portable radiotelephone according to claim 3 further comprising a second antenna.

5. A portable radiotelephone comprising:

a. a keypad positioned on a first side of said radiotelephone;
b. a speaker positioned on a second side of said radiotelephone, said second side being opposite to said first side;
c. a flip cover hinged to an edge of said radiotelephone between said first side and second side, said flip cover having a closed position that at least partially covers said keypad, said flip having an open position angled less than approximately 180 degrees to said second side of the radiotelephone, said flip cover being rotatably hinged to said edge to rotate between said open position and closed position.

6. A portable radiotelephone according to claim 5 wherein said flip cover in said closed position does not cover at least one activation key on said keypad.

7. A portable radiotelephone according to claim 5 wherein said flip cover has a first cover side facing said key pad when in said closed position and an opposite cover side, said flip cover further comprising a microphone positioned to receive sound energy broadcast against said opposite cover side.

* * * * *